(12) United States Patent
Shen

(10) Patent No.: US 8,307,228 B2
(45) Date of Patent: Nov. 6, 2012

(54) INTEGRATED NETWORK CHIP AND ELECTRONIC DEVICE

(75) Inventor: Hsin-Hung Shen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 469 days.

(21) Appl. No.: 12/712,211

(22) Filed: Feb. 25, 2010

(65) Prior Publication Data

US 2010/0226388 A1 Sep. 9, 2010

Related U.S. Application Data

(60) Provisional application No. 61/156,887, filed on Mar. 3, 2009.

(30) Foreign Application Priority Data

Jan. 21, 2010 (TW) ................................ 99101676 A

(51) Int. Cl.
*G06F 1/32* (2006.01)
*G06F 1/26* (2006.01)
*G06F 1/28* (2006.01)
*G06F 11/30* (2006.01)
*G06F 13/12* (2006.01)

(52) U.S. Cl. ........ 713/320; 713/300; 713/322; 713/323; 713/324; 713/340; 710/62; 710/63; 710/64; 710/72; 710/73; 710/74

(58) Field of Classification Search ........................ None
See application file for complete search history.

(56) References Cited

U.S. PATENT DOCUMENTS

| | | | | |
|---|---|---|---|---|
| 2006/0095626 A1* | 5/2006 | Tsay et al. | ..................... | 710/301 |
| 2007/0132733 A1* | 6/2007 | Ram | ............................. | 345/163 |
| 2008/0172512 A1 | 7/2008 | Wu et al. | | |
| 2010/0077123 A1* | 3/2010 | Chien et al. | .................. | 710/305 |
| 2010/0226388 A1* | 9/2010 | Shen | ............................. | 370/463 |
| 2011/0087902 A1* | 4/2011 | Lu et al. | ........................ | 713/300 |

* cited by examiner

*Primary Examiner* — Tanh Nguyen
(74) *Attorney, Agent, or Firm* — Jianq Chyun IP Office

(57) ABSTRACT

An integrated network chip and an electronic device using the chip are illustrated. The integrated network chip includes at least a first access interface, at least a second access interface, a power management unit (PMU) and an interface bridge. The first access interface and second access interface respectively provides the electronic device with a local area network connection function and a memory card access function. The interface bridge integrates the first access interface and second access interface by providing a hub-like functionality. The PMU provides the power and the ground to the first access interface, second access interface and the interface bridge. When the PMU detects the second access interface enters a power saving mode, the PMU provides a lower operation voltage to the second access interface.

12 Claims, 6 Drawing Sheets

INTEGRATED NETWORK CHIP AND ELECTRONIC DEVICE

CROSS-REFERENCE TO RELATED APPLICATION

This application claims the priority benefit of U.S. provisional application Ser. No. 61/156,887, filed on Mar. 3, 2009 and Taiwan application serial no. 99101676, filed Jan. 21, 2010. The entirety of each of the above-mentioned patent applications is hereby incorporated by reference herein and made a part of specification.

BACKGROUND

1. Technical Field

The disclosure relates to an integrated network chip, more particularly, to an integrated network chip, an electronic device using the integrated network chip.

2. Description of Related Art

Nowadays most of the laptops, netbooks, mobile internet devices (MID), and smartphones usually have at least one built-in local area network module or at least one built-in wireless local area network module, or even a card-reader. If the users need to connect these modules externally when they want to use these functions of the modules, it would be very inconvenient. FIG. 1 is a block diagram showing a conventional independent packaging system having the network function and the card-reader function. In FIG. 1, each of the local area network access interface 120 and the card-reader access interface 140 is packaged independently, wherein the local area network access interface 120 and the card-reader access interface 140 are respectively connected to the local area network interface 130 and the memory card slot 150. In addition, the local area network access interface 120 and the card-reader access interface 140 are connected to the host chipset 112 of the electronic device 110 via the peripheral component interconnect (PCI) interface. Alternatively, the local area network access interface 120 and the card-reader access interface 140 are connected to the host chipset 112 of the electronic device 110 via the peripheral component interconnect express (PCI/e) interface. However, the circuit configuration of the conventional independent packaging system requires at least two independent standard interfaces, and at least two independent power supply sources, wherein each of the independent power supply sources includes the power supply terminal and the ground terminal. The two independent standard interfaces provide the input signals and the output signals respectively to the local area network access interface 120 and the card-reader access interface 140. The power supply sources are respectively coupled to the local area network access interface 120 and the card-reader access interface 140 via the power supply terminals and the ground terminals thereof, and respectively provide the power and the grounding to the local area network access interface 120 and the card-reader access interface 140. Accordingly, the circuit configuration of the conventional independent packaging system occupies more circuit wiring, chip pads and chip area, and further causes high packaging cost and high power consumption.

FIG. 2 is a block diagram showing an integrated system using a single bus to connect the electronic device and the wireless network card controller, and to connect the electronic device and the card-reader controller. The integrated system 210 shown in FIG. 2 is the technology disclosed in US Patent 20080172512 for overcoming the problems mentioned above. In the integrated system 210, the electronic device 250 uses the universal serial bus (USB) interface between the power and data units 252, 246 to provide the power supply, the ground, and the signal exchange function to the bus interface 240. The power and data unit 246 of the bus interface 240 is connected to the electronic device 250 for data exchange or data transmission. In addition, the bus interface 240 is connected to the power and data unit 222 of the wireless network card controller 220 via the power and data unit 242, and the bus interface 240 is further connected to the power and data unit 232 of the card-reader controller 230 via the power and data unit 244, such that the bus interface 240 provides the power and the ground to the wireless network card controller 220 and the card-reader controller 230, and exchanges signal with the wireless network card controller 220 and the card-reader controller 230. However, the integrated system 210 still occupies at least three sets of the power supply, the ground, and the corresponding pins. Therefore, it occupies more circuit wiring and chip area, and further causes high packaging cost and power consumption.

SUMMARY

According to the exemplary embodiment of the present disclosure, the exemplary embodiment provides an integrated network chip and an electronic device using the integrated network chip. The integrated network chip provides an interface device having a hub-like function to connect a first access interface providing the local area network connection function, and to connect a second access interface providing the memory card access function to the electronic device. When the second access interface enters a power saving mode, the integrated network chip provides a lower operation voltage to the core chip of the first access interface and the second access interface. Accordingly, the area, the pin counts, and the power consumption of the integrated network chip for packaging can be decreased.

According to the exemplary embodiment of the present disclosure, the exemplary embodiment provides an integrated network chip for an electronic device. The integrated network chip includes at least one first access interface, at least one second access interface, an interface bridge, and a power management unit. The first access interface provides a local area network connection function to the electronic device. The second access interface provides a memory card access function to the electronic device. The interface bridge is coupled to the first access interface and the second access interface, and provides a hub-like function to integrate the first access interface and the second access interface. The power management unit is coupled to the first access interface, the second access interface, and the interface bridge. The power management unit provides a first voltage to the first access interface, and provides a second voltage to the second access interface. When the power management unit determines that the second access interface enters a power saving mode, the power management unit provides a first voltage to the second access interface, wherein the first voltage is less than the second voltage.

According to the exemplary embodiment of the present disclosure, the first access interface of the integrated network chip is a local area network control chip, and the first access interface is coupled to at least one local area network connector, so as to provide the local area network connection function to the electronic device.

According to the exemplary embodiment of the present disclosure, the second access interface of the integrated network chip is a card-reader control chip, and is coupled to at least one card-reader slot to access a memory card in the card-reader slot, wherein the card-reader slot is an all-in-one card-reader slot.

According to the exemplary embodiment of the present disclosure, when the first access interface transceives a local area network packet, the second access interface stays in a standby mode. When the first access interface does not transceive the local area network packet, the electronic device is able to access the memory card via the second access interface.

According to the exemplary embodiment of the present disclosure, the electronic device includes a computer motherboard, and the integrated network chip is disposed on the computer motherboard.

According to the exemplary embodiment of the present disclosure, the integrated network chip further includes a set of power management pins which has a set of power pins and a ground pin, wherein the power pin is for receiving an external power and the ground pin is for connecting to an external ground, and the interface bridge, the first, and second access interfaces share the set of the power pins and the ground pin.

According to the exemplary embodiment of the present disclosure, the power management unit receives a system power provided by the electronic device, and a voltage value of the system power is a third voltage, wherein the power management unit transforms the third voltage into the first voltage and the second voltage. In addition, the power management unit provides the third voltage to the interface bridge.

According to the exemplary embodiment of the present disclosure, the first voltage substantially equals to 1.2V, the second voltage substantially equals to 1.8V, and the third voltage substantially equals to 3.3V.

According to the exemplary embodiment of the present disclosure, the interface bridge has at least one first end and at least one second end, wherein the first end and the second end are respectively coupled to the first access interface and the second access interface.

According to the exemplary embodiment of the present disclosure, the present disclosure provides an electronic device including a host and an integrated network chip. The integrated network chip is connected to the host for data exchange. The integrated network chip includes at least one first access interface, at least one second access interface, an interface bridge, and a power management unit. The first access interface provides a local area network connection function to the electronic device. The second access interface provides a memory card access function to the electronic device. The interface bridge is coupled to the first access interface and the second access interface, and provides a hub-like function to integrate the first access interface and the second access interface. In addition, the power management unit is coupled to the first access interface, the second access interface, and the interface bridge. The power management provides a first voltage to the first access interface, and provides a second voltage to the second access interface. When the power management unit determines that the second access interface enters a power saving mode, the power management unit provides a first voltage to the second access interface, wherein the first voltage is less than the second voltage.

According to the exemplary embodiment of the present disclosure, the interface bridge has at least one first end, at least one second end, and at least one third end, wherein the first end is coupled to the first access interface, the second end is coupled to the second access interface, and the third end is coupled to the host of the electronic device.

In summary, the exemplary embodiments of the present disclosure provide an integrated network chip and an electronic device using the integrated network chip. The integrated network chip provides an interface bridge having a hub-like function to connect a first access interface providing the local area network connection function, and to connect a second access interface providing the memory card access function to the electronic device. In addition, when the second access interface enters a power saving mode, the integrated network chip provides a lower operation voltage to the second access interface. Accordingly, the area, the pin counts, the hardware fabrication cost, and the power consumption of the integrated network chip for packaging can be decreased.

In order to make the aforementioned and other features and advantages of the present disclosure more comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EXEMPLARY EMBODIMENTS

Figure 1:
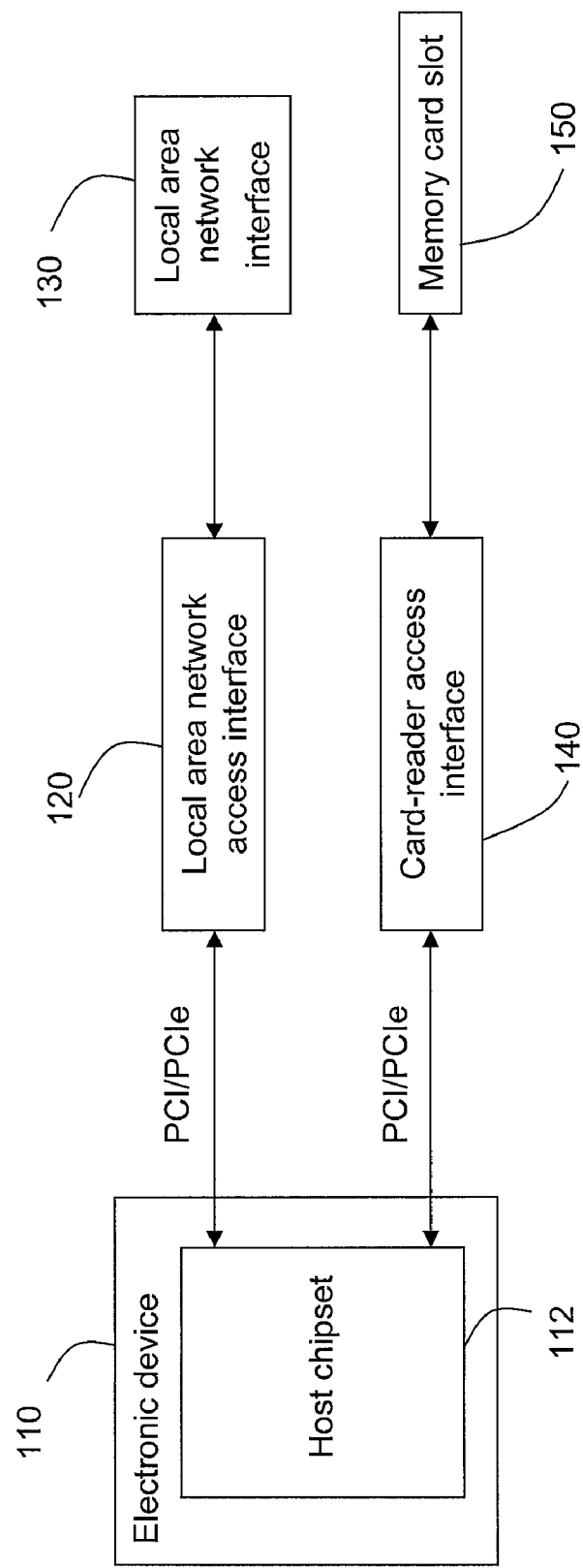
FIG. 1 is a block diagram showing a conventional independent packaging system having the network function and the card-reader function.
Figure 2:
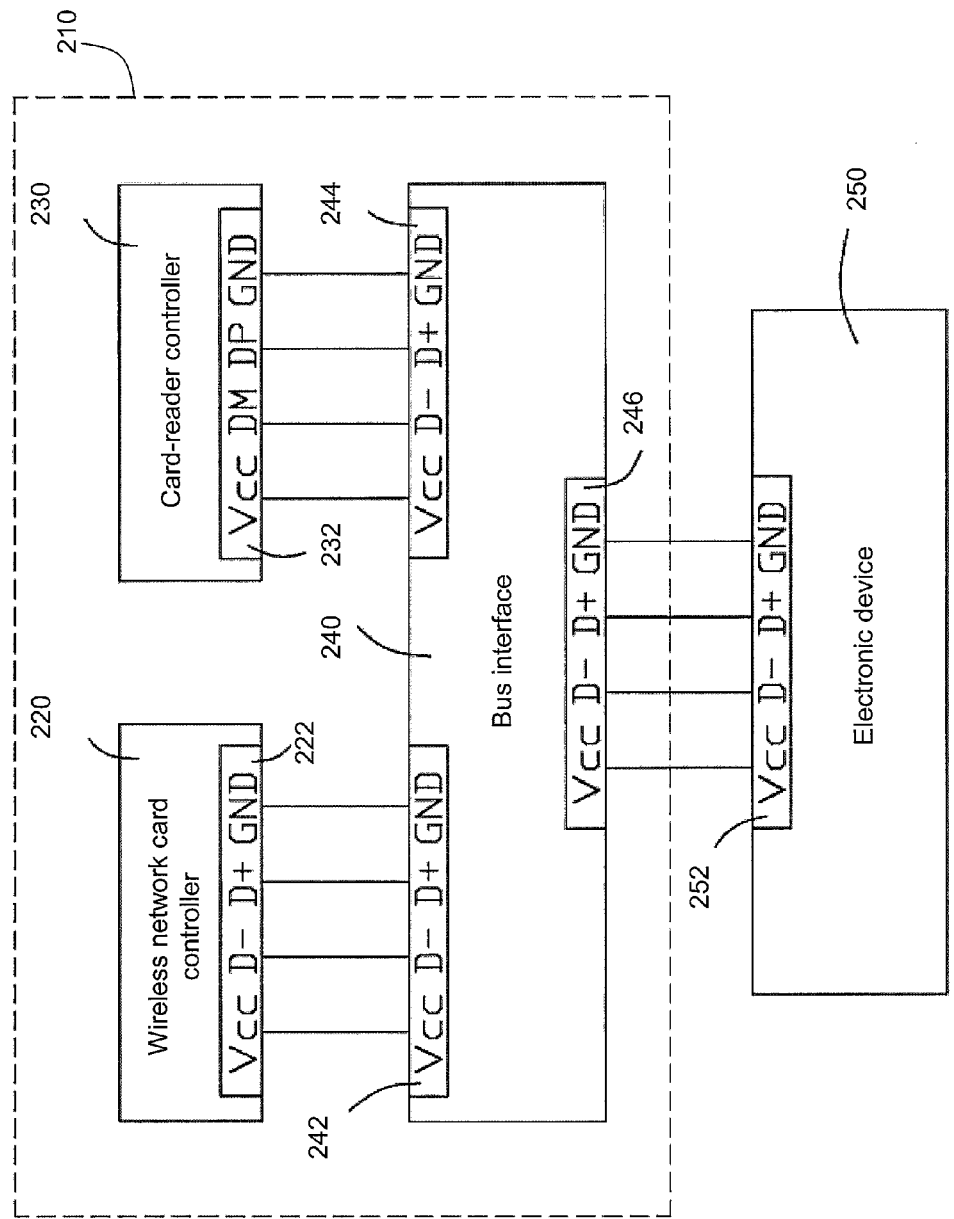
FIG. 2 is a block diagram showing an integrated system using a single bus to connect the electronic device and the wireless network card controller, and to connect the electronic device and the card-reader controller.

Descriptions of the present disclosure are given with reference to the exemplary embodiments illustrated with accompanied drawings wherein same or similar parts are denoted with same reference numerals.

According to the exemplary embodiment of the present disclosure, the present disclosure provides an integrated network chip, and a circuit board and/or an electronic device using the integrated network chip. The integrated network chip provides an interface device having a hub-like function for connecting a first access interface providing the local area network connection function and a second access interface providing the memory card access function, to the electronic device. When the second access interface enters a power saving mode, the integrated network chip provides, among the operation voltages, a lower operation voltage to the core chip of the first access interface and the second access interface. The interface bridge having a hub-like function, the first access interface, and the second access interface share the same power management unit, and a set of power pins and a ground pin thereof. Besides, the followings are only described with reference to the exemplary embodiments, but the scope of the present disclosure will not be limited.

Figure 3:
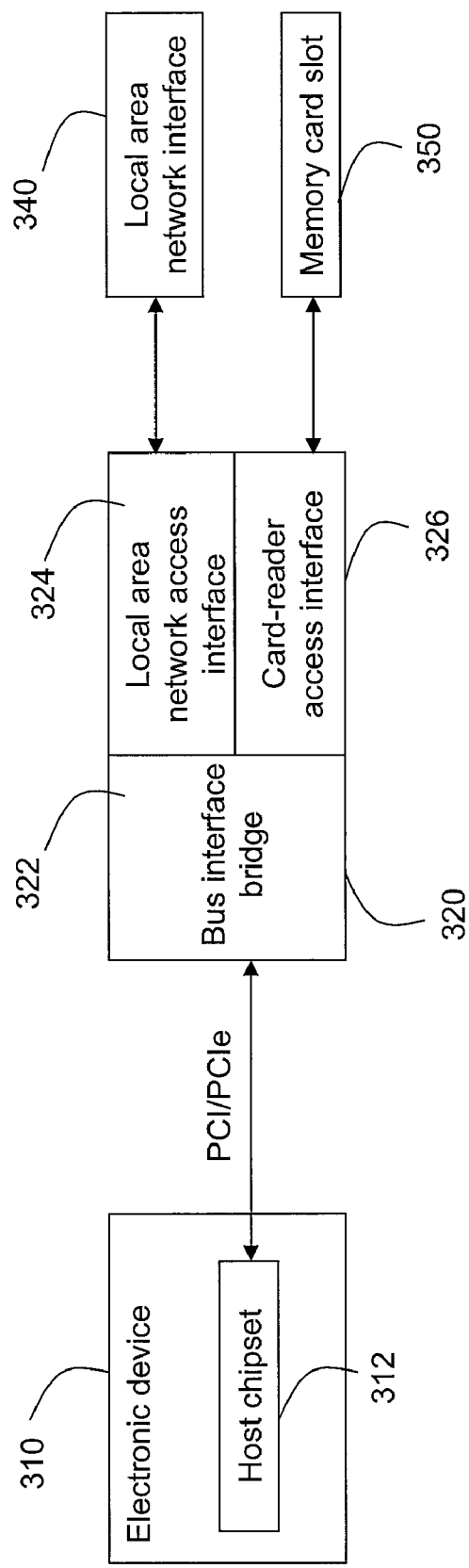
FIG. 3 shows a block diagram showing an integrated network chip according to an exemplary embodiment of the present disclosure.

Referring to FIG. 3, FIG. 3 is a block diagram showing an integrated network chip according to the exemplary embodiment of the present disclosure. The integrated network chip 320 includes the bus interface bridge 322, the local area network access interface 324, and the card-reader access interface 326. In the exemplary embodiment, the integrated network chip 320 exchanges signals or data via the bus interface bridge 322 with the host chipset 312 of the electronic device 310. The integrated network chip 320 obtains a system power (not shown) from the electronic device 310. The electronic device 310 includes a computer motherboard, and the electronic device 310 can be a laptop, a netbook, a mobile internet device (MID), a personal navigation device (PND), a personal multimedia player (PMP), or a smartphone. The host chipset 312 performs the main functions of the electronic device 310, such as surfing the net, handling document work, playing multimedia and so on. The interface between the bus interface bridge 322 and the host chipset 312 may be the peripheral component interconnect (PCI) interface or the peripheral component interconnect express (PCI/e) interface. However, the present disclosure is not limited to thereto. The interface between the bus interface bridge 322 and the host chipset 312 can be other standard interfaces, such as USB interface. In addition, the bus interface bridge 322, the local area network access interface 324 and the card-reader access interface 326 can communicate with one another via the USB interface, the PCI interface or the PCI/e interface.

The local area network access interface 324 provides the local area network connection function to the electronic device 310, and is coupled to the local area network interface 340 which may be the RJ-45 interface, or other local area network interface, such as wireless local area network interface IEEE 802.11a/b/g. When the data transmission rate of the local area network access interface 324 and the local area network interface 340 is 10 Megabits per second (Mbps) or 100 Mbps, the local area network access interface 324 and the local area network interface 340 are connected to each other by using two twisted pair wires. When the data transmission rate of the local area network access interface 324 and the local area network interface 340 is higher than 10 Gigabits per second (Gbps), that is, the local area network interface 340 is a network interface of a Gigabit local area network (GLAN), a fiber or four twisted pair wires are used for transmitting data between the local area network access interface 324 and the local area network interface 340.

The card-reader access interface 326 provides a memory card access function to the electronic device 310, and is coupled to a memory card slot 350. The memory card slot 350 is an all-in-one card-reader slot, such as a 7-in-1 card-reader slot, and can support multiple card-reader format standard, such as the multimediacard (MMC) standard, the memory stick card (MS Card) standard, or the secure digital card (SD card) standard. In addition, in other exemplary embodiments, the interface between card-reader access interface 326 and the memory card slot 350 may be the secure digital input/output (SDIO) interface.

Figure 4:
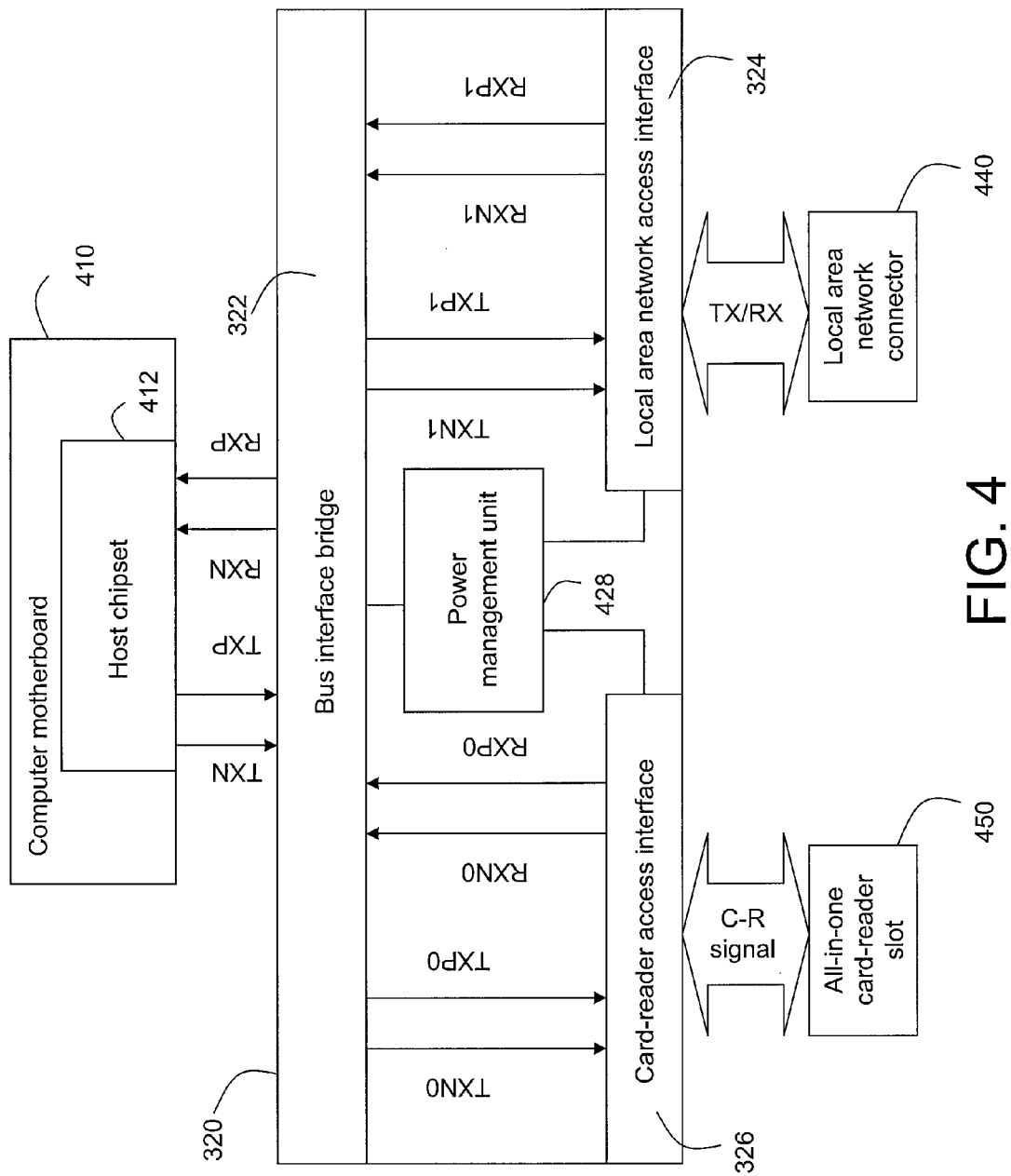
FIG. 4 shows a block diagram showing an integrated network chip according to another exemplary embodiment of the present disclosure.

FIG. 4 is a block diagram showing an integrated network chip according to another exemplary embodiment of the present disclosure. The bus interface bridge 322 of the integrated network chip 320 has one first end, one second end, and one third end. The first end, the second end, and the third end of the bus interface bridge 322 are respectively coupled to the local area network access interface 324, the card-reader access interface 326, and the host chipset 412 of the computer motherboard 410 (or a computer host platform). In addition, the integrated network chip 322 has the hub-like function. Therefore, the integrated network chip 320 can integrate the local area network access interface 324 and the card-reader access interface 326 via the bus interface bridge 322. In other words, the bus interface bridge 322 arranges the schedule for transmitting data to the computer host from the card-reader access interface 326 and the local area network access interface 324. The bus interface bridge 322 may further transform the format of the data transmitted from the card-reader access interface 326 and the local area network access interface 324, such that the data format may be accessed by the computer host. It is noted that, in the exemplary embodiment, a PCI/e interface is used to connect the bus interface bridge 322 and the computer host chipset 412. Therefore, the computer host chipset 412 uses a set of differential signal wires TXP and TXN to transmit data to the bus interface bridge 322. The computer host chipset 412 uses another set of differential signal wires RXP and RXN to receive the data from the bus interface bridge 322.

In the exemplary embodiment, in addition to the computer host chipset 412, the computer motherboard 410 includes CPU chips, memory modules, and other power management modules. The techniques about the circuit of the computer motherboard are known to people of ordinary skill in the art, so the details will not be repeatedly described.

In the exemplary embodiment, the first end of the bus interface bridge 322 may be the PCI/e interface, and the second and third ends of the bus interface bridge 322 may also be the PCI/e interface. But the present disclosure is not limited to kinds of the interfaces used in the first, second, and third ends. To be more specific, a set of differential signal wires TXP0 and TXN0 interface is used by the bus interface bridge 322 and the card-reader access interface 326, so as to transmit data to the card-reader access interface 326. The bus interface bridge 322 uses another set of differential signal wires RXP0 and RXN0 to receive the data from the card-reader access interface 326. In addition, the bus interface bridge 322 uses a set of differential signal wires TXP1 and TXN1 to transmit data to the local area network access interface 324. The bus interface bridge 322 uses another set of differential signal wires RXP1 and RXN1 to receive the data from the local area network access interface 324.

In the exemplary embodiment, the integrated network chip 320 further includes a power management unit 428 and a set of power management pins (not shown). The power management unit 428 is coupled to the bus interface bridge 322, the local area network access interface 324, and the card-reader access interface 326, so as to provide power and grounding to the bus interface bridge 322, the local area network access interface 324, and the card-reader access interface 326. The power management unit 428 performs other functions which relate to power control. In addition, the set of power management pins receives the external power (not shown) and connects to the external ground (not shown), and is used as the common power pins and a common ground pin of the bus interface bridge 322, the local area network access interface 324, and the card-reader access interface 326. In other words, the bus interface bridge 322, the local area network access interface 324, and the card-reader access interface 326 share the identical set of the power pins and the ground pin. Accordingly, the manner for packaging the integrated network chip 320 can save at least one PCI/e interface and decrease the pin counts for packaging. For example, originally, the local area network access interface 324 and the card-reader access interface 326 are respectively two chips having 48 pins. By the integration manner of the integrated network chip 320 and the scheme for sharing power management, the integrated network chip 320 using PCI/e interface and having been properly integrated only requires 64 pins. In addition, in other exemplary embodiments, the integrated network chip 320 can use the USB interface or the PCI interface. However, when the PCI/e interface is used to support the SDIO interface and the GLAN network interface, the integrated network chip 320 has the high power management efficiency and the high data transmission rate.

Furthermore, in the exemplary embodiment, the card-reader access interface 326 transmits the data (C-R signal) to the memory card in the all-in-one card-reader slot 450, or receives data (C-R signal) from the memory card in the all-in-one card-reader slot 450. The local area network access interface 324 transmits the data (TX/RX signal) to the local area network card plugged in the local area network connector 440, or receives data (TX/RX signal) from the local area network card plugged in the local area network connector 440.

In the exemplary embodiment, the operation principles of the integrated network chip 320 and the computer host chipset 412 are described as follows. When the integrated network chip 320 transceives the local area network packet via the local area network access interface 324, the card-reader access interface 326 stays in a standby mode. In addition, when the local area network access interface 324 does not receive and transmit the local area network packet, the computer motherboard 410 is able to access the memory card via the card-reader access interface 326.

In the exemplary embodiment, when the electronic device provides a system power to the integrated network chip 320, the power management pins receive the system power (the voltage value may be 3.3V). The power management pins (not shown) are connected to the power management unit 428, such that the power management unit receives the system power of the identical voltage value. The power management unit 428 further transforms the system power into the first voltage (the voltage value may be 1.2V), and provides the first voltage to the core chip of the local area network access interface 324. The power management unit 428 further transforms the system power into the second voltage (the voltage value may be 1.8V), and provides the second voltage to the core chip of the card-reader access interface 326. The first voltage provided by the power management unit 428 to the core chip of the local area network access interface 324 only maintains the input/output (I/O) operation of the local area network access interface 324. The second voltage provided by the power management unit 428 to the core chip of the card-reader access interface 326 only maintains the I/O operation of the card-reader access interface 326. The power management unit 428 also provides the power of the third voltage (the voltage value may be 3.3V) to the bus interface bridge 322. In the exemplary embodiment, the voltage of the system power is identical to the third voltage, such that the power management unit 428 does not require to perform voltage transformation for this instance.

When the power management unit 428 determines the card-reader access interface 326 is or may be entering a power saving mode, the power management unit 428 provides a voltage (substantially less than the second voltage) to the core chip of the card-reader access interface 326. For example, the voltage received by the card-reader access interface 326 during the power saving mode is the first voltage (the voltage value may be 1.2V) which is less than the second voltage (the voltage value may be 1.8V). Although the voltage of 1.2V does not maintain the normal operation of the card-reader access interface 326, the voltage of 1.2V maintains the card-reader access interface 326 to stay in the standby mode. Accordingly, the operation voltage value of the core chip of the card-reader access interface 326 can be decreased, and the entire power consumption of the integrated network chip 320 can be further reduced. To put it more specific, when the integrated network chip 320 uses the PCI/e interface and enters the power saving mode, the integrated network chip 320 is in a deep slumber mode (DSM). When the integrated network chip 320 uses the USB interface and enters the power saving mode, the integrated network chip 320 is in a selective suspend mode. In addition, the operating firmware (not shown) in the computer motherboard 410 can determine whether the local area network access interface 324 or the card-reader access interface 326 is transmitting or receiving data, and thus whether the local area network access interface 324 or the card-reader access interface 326 enters the power saving mode can be determined correspondingly. Moreover, after the card-reader access interface 326 stops transmitting and receiving data, and maintains the current condition for a time period more than a preset waiting time, the power management unit 428 determines the card-reader access interface 326 enters the power saving mode. When the power management unit 428 determines that the card-reader access interface 326 enters the power saving mode, the power management unit 428 provides the first voltage to the card-reader access interface 326. However, the present disclosure is not limited thereto. Whether the electronic device connected to the integrated network chip 320 enters the power saving mode, or whether the integrated network chip 320 or the element thereof enters the power saving mode can be also determined by the other methods. The other methods of the determination are known to people skilled in the art, so the details will not be repeatedly described.

In the exemplary embodiment, the integrated network chip 320 is disposed on the computer motherboard 410. However, the present disclosure is not limited thereto, in the other exemplary embodiments, the integrated network chip 320 can be connected to the computer motherboard 410 or the electronic device 310 via external connection interfaces.

Figure 5:
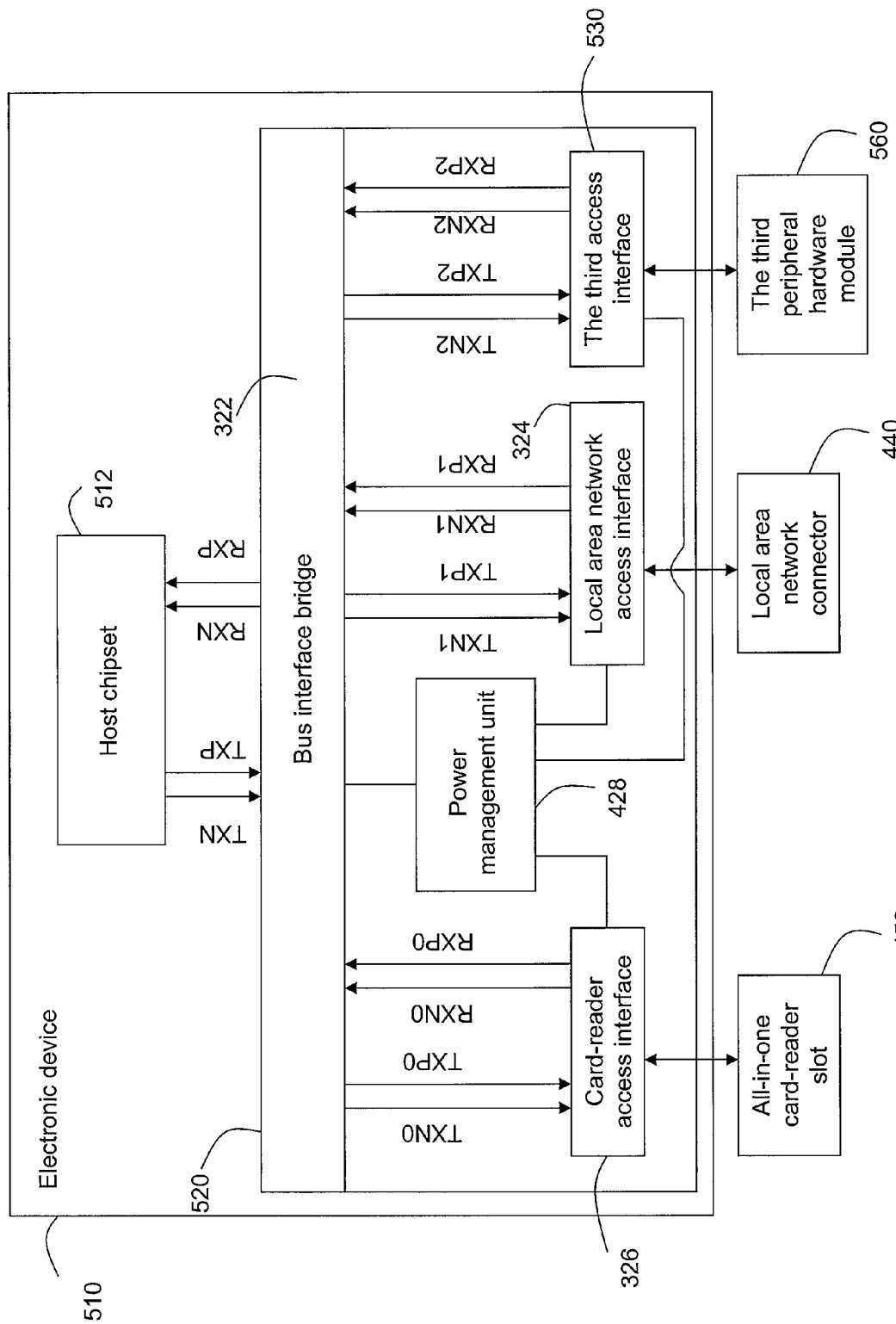
FIG. 5 shows a block diagram showing an electronic device having an integrated network chip according to another exemplary embodiment of the present disclosure.

FIG. 5 is a block diagram showing an electronic device having an integrated network chip according to another exemplary embodiment of the present disclosure. Referring to FIG. 5, in the exemplary embodiment, an electronic device 510 includes a host chipset 512 (having main system chips), a CPU (not shown), a memory module (not shown), and an integrated network chip 520. The host chipset 512 performs the main functions of the electronic device 510, such as the logic operation, the file management function, and so on. The integrated network chip 520 exchanges signals or data with the host chipset 412 of the electronic device 510. The integrated network chip 520 and the integrated network chip 420 in FIG. 4 are generally similar, except for the difference as follows.

In the exemplary embodiment, the integrated network chip 520 further includes a third access interface 530. The third access interface 530 is coupled to a third peripheral hardware module 560 to provide other functions to the electronic device 510. The bus interface bridge 322 has a hub-like function to integrate the local area network access interface 324, the card-reader access interface 326, and the third access interface 330. The fourth end of the bus interface bridge 322 is coupled to the third access interface 530. The power management unit 428 is also coupled to the third access interface 330. The power management unit 428 provides the common power and the common grounding to the bus interface bridge 322, the local area network access interface 324, the card-reader access interface 326, and the third access interface 330. Being different from the power management unit 428 in FIG. 4, the power management unit 428 in FIG. 5 further provides the fourth voltage to the third access interface 330. In addition, the set of power management pins (not shown) of the integrated network chip 520 serve as the common power pins and a common ground pin of the bus interface bridge 322, the local area network access interface 324, the card-reader access interface 326, and the third access interface 330. In addition, the bus interface bridge 322 uses a set of differential signal wires TXP2 and TXN2 to transmit signals to the third access interface 530. The bus interface bridge 322 uses another set of differential signal wires RXP2 and RXN2 to receive the signals transmitted from the third access interface 530.

However, the present disclosure is not limited thereto, in other exemplary embodiments, the integrated network chip may include more than three access interfaces to provide different functions to the electronic device, such as the functions of recording video, recording audio, or receiving global positioning system (GPS) signal. In other words, the bus interface bridge of the integrated network chip requires providing the proper number of the connection ends according to the number of the access interfaces to which the electronic device is connected. For example, in the exemplary embodiment shown in FIG. 5, in addition to the host chipset 512, the bus interface bridge 322 is connected to other three access interfaces. Therefore, at least four connection ends are required.

The electronic device 510 provides the system power to the integrated network chip 520. The system power is received by the power management unit 428 via the power management pins. According to the power requirement of the bus interface bridge 322, the local area network access interface 324, the card-reader access interface 326, and the third access interface 530, the power management unit 428 transforms the voltage of the system power, so as to provide several power levels to them.

When the power management unit 428 determines that the electronic device 510 enters the power saving mode, the power management unit 428 provides a first voltage (substantially less than the second voltage and the fourth voltage) to the core chip of the card-reader access interface 326 and the core chip of the third access interface 530. In other exemplary embodiments, if the second voltage is less than the fourth voltage, the power management unit 428 will further provide the second voltage to the third access interface 530 when it provides the first voltage to the card-reader access interface 326. Accordingly, the operation voltage values of the core chip of the card-reader access interface 326 and the core chip of the third access interface 530 can be decreased, and the entire power consumption of the integrated network chip 520 and the electronic device 510 can be further decreased.

Figure 6:
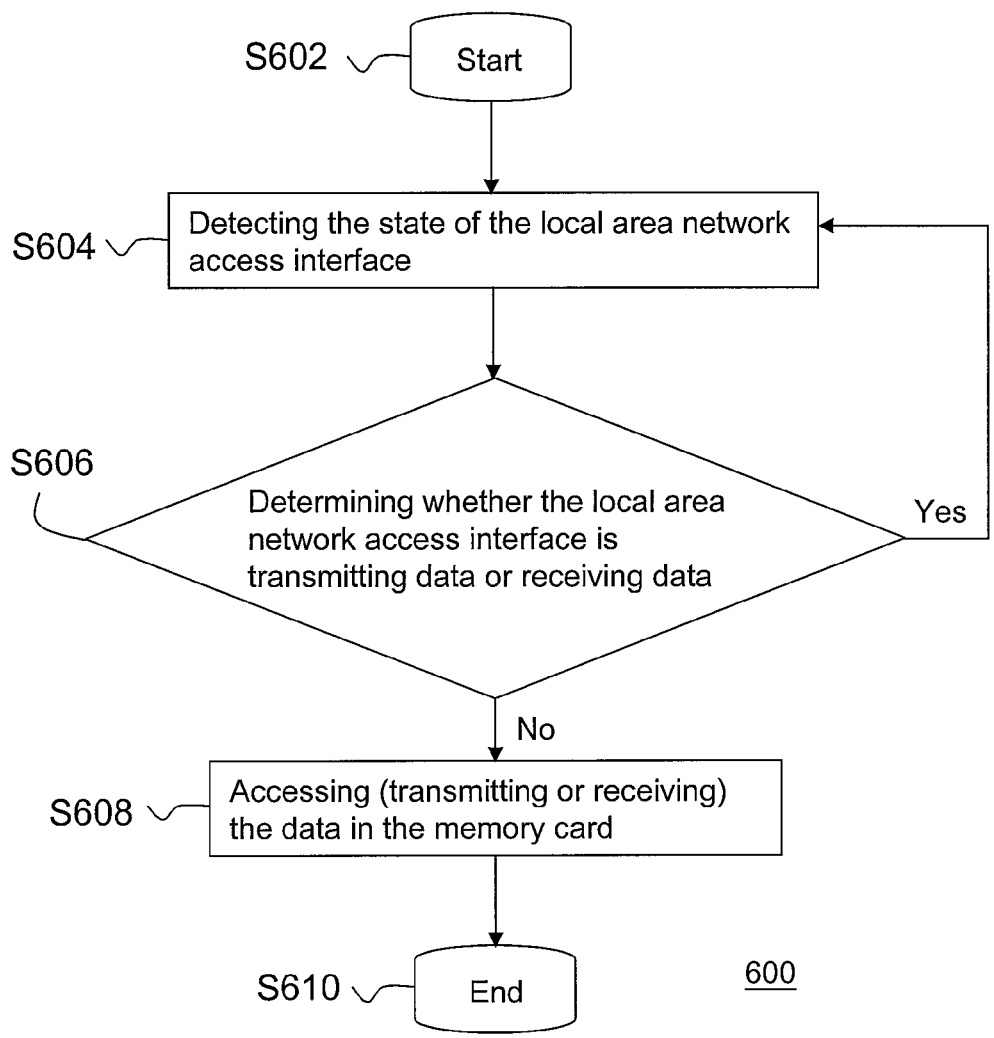
FIG. 6 is a flow chart showing the operation method of the integrated chip according to an exemplary embodiment of the present disclosure.

FIG. 6 is a flow chart showing the operation method of the integrated chip according to an exemplary embodiment of the present disclosure. Referring to FIG. 6, in the embodiment, the operation method 600 of the integrated chip starts at step S602. In step S604, the bus interface bridge 322 detects the state of the local area network access interface 324. After step S604 is executed, step S606 is executed. In step S606, if the bus interface bridge 322 detects that the local area network access interface 324 is transmitting data to the local area network connector 340, or the local area network access interface 324 is receiving data from the local area network connector 340, the card-reader access interface 326 will stay in the standby mode, and the operation method 600 of the integrated chip will go back to step S604. On the contrary, if the bus interface bridge 322 detects that the local area network access interface 324 is not transmitting data to the local area network connector 340, and the local area network access interface 324 is not receiving data from the local area network connector 340, the electronic device 510 will be able to access the data in the memory card in the all-in-one card-reader slot via the card-reader access interface 326 in Step S608. That is, the electronic device 510 can transmit the data to the memory card, or receive data from the memory card, only when the local area network access interface 324 does not transceive the data. After step S608 is executed, step S610 is executed, and the operation method 600 of the integrated chip ends herein.

In summary, according to the exemplary embodiments of the present disclosure, the exemplary embodiments of the present disclosure provide an integrated network chip and an electronic device using the integrated network chip. The integrated network chip provides an interface bridge having a hub-like function. The interface bridge connects a first access interface providing the local area network connection function to the electronic device, and connects a second access interface providing the memory card access function to the electronic device. When the electronic device enters the power saving mode, the lower operation voltage to the core chip of the first access interface and the second access interface is provided. In addition, the interface bridge, the first access interface, and second access interface share the same power management unit, and the set of power pins, and ground pin thereof. Accordingly, the area, the pin counts, the hardware fabrication cost, and the power consumption of the integrated network chip for packaging can be decreased.

Although the present disclosure has been described with reference to the above exemplary embodiments, it will be apparent to one of the ordinary skill in the art that modifications to the described exemplary embodiment may be made without departing from the spirit of the present disclosure. Accordingly, the scope of the present disclosure will be defined by the attached claims not by the above detailed descriptions.

What is claimed is:

1. An integrated network chip, for an electronic device, comprising:
    at least one first access interface, providing a local area network connection function to the electronic device;
    at least one second access interface, providing a memory card access function to the electronic device;
    an interface bridge coupled to the first access interface and the second access interface, the interface bridge providing a hub-like function to integrate the first access interface and the second access interface;
    a power management unit coupled to the first access interface, the second access interface, and the interface bridge, the power management unit providing a first voltage to the first access interface, and providing a second voltage to the second access interface,
    wherein when the power management unit determines that the second access interface enters a power saving mode, the power management unit provides the first voltage to the second access interface, and the first voltage is less than the second voltage.

2. The integrated network chip of claim 1, wherein the first access interface is a local area network control chip, and the first access interface is coupled to at least one local area network connector, so as to provide the local area network connection function to the electronic device.

3. The integrated network chip of claim 2, wherein the second access interface is a card-reader control chip, and is coupled to at least one card-reader slot to access a memory card in the card-reader slot, wherein the card-reader slot is an all-in-one card-reader slot.

4. The integrated network chip of claim 3, wherein, when the first access interface transceives a local network packet, the second access interface stays in a standby mode; when the first access interface does not receive nor transmit the local area network packet, the electronic device is able to access the memory card via the second access interface.

5. The integrated network chip of claim 1, wherein the electronic device includes a computer motherboard, and the integrated network chip is disposed on the computer motherboard.

6. The integrated network chip of claim 1, further comprising:
a set of power management pins, having a set of power pins and a ground pin, wherein the set of power pins receives an external power and the ground pin connects to an external ground, wherein the interface bridge, the first access interface, and second access interface share the set of power pins and the ground pin.

7. The integrated network chip of claim 1, wherein the power management unit receives a system power provided by the electronic device, and a voltage value of the system power is a third voltage, wherein the power management unit transforms the third voltage into the first voltage and the second voltage; and the power management unit provides the third voltage to the interface bridge.

8. The integrated network chip of claim 7, wherein the first voltage substantially equals to 1.2V, the second voltage substantially equals to 1.8V, and the third voltage substantially equals to 3.3V.

9. The integrated network chip of claim 1, wherein the interface bridge has at least one first end and at least one second end, wherein the first end and the second end are respectively coupled to the first access interface and the second access interface.

10. An electronic device, comprising:
a host; and
an integrated network chip, wherein the integrated network chip is connected to the host for data exchange, the integrated network chip comprises:
at least one first access interface, providing a local area network connection function to the electronic device;
at least one second access interface, providing a memory card access function to the electronic device;
an interface bridge coupled to the first access interface and the second access interface, the interface bridge providing a hub-like function to integrate the first access interface and the second access interface;
a power management unit coupled to the first access interface, the second access interface, and the interface bridge, the power management unit providing a first voltage to the first access interface, and providing a second voltage to the second access interface,
wherein when the power management unit determines that the second access interface enters a power saving mode, the power management unit provides a first voltage to the second access interface, and the first voltage is less than the second voltage.

11. The electronic device of claim 10, comprising a computer motherboard, wherein the integrated network chip is disposed on the computer motherboard.

12. The electronic device of claim 10, wherein the interface bridge has at least one first end, at least one second end, and at least one third end, wherein the first end is coupled to the first access interface, the second end is coupled to the second access interface, and the third end is coupled to the host of the electronic device.

* * * * *